United States Patent [19]

Peerman et al.

[11] Patent Number: 4,582,895

[45] Date of Patent: Apr. 15, 1986

[54] FATTY SEGMENTED POLYESTER ELASTOMERS

[75] Inventors: Dwight E. Peerman, Minnetonka; H. Gordon Kanten, Minneapolis; Roger A. Lovald, Roseville, all of Minn.

[73] Assignee: Henkel Corporation, Minneapolis, Minn.

[21] Appl. No.: 677,935

[22] Filed: Dec. 4, 1984

[51] Int. Cl.[4] .............................................. C08G 63/48
[52] U.S. Cl. .............................. 528/295.3; 525/444.5; 528/300; 528/301
[58] Field of Search ..................... 528/295.3, 300, 301; 525/444.5

[56] References Cited

U.S. PATENT DOCUMENTS

| | | | |
|---|---|---|---|
| Re. 31,270 | 6/1983 | Tung | 528/295.3 |
| 3,383,343 | 5/1968 | Mohajer et al. | 528/295.3 |
| 3,954,689 | 5/1976 | Hoeschele | 528/295.3 |
| 4,254,001 | 3/1981 | Tung | 528/295.3 |
| 4,264,761 | 4/1981 | McGirk | 528/295.3 |

*Primary Examiner*—Lucille M. Phynes
*Attorney, Agent, or Firm*—Ernest G. Szoke; J. Daniel Wood

[57] ABSTRACT

Fatty, segmented polyester elastomers are provided which are prepared from a mixture having a molar ratio of aromatic to fatty reactants of less than 4:1 and a molar ratio of short-chain diol to long-chain poly(ether) diol reactants of less than 49:1. These elastomers are useful as hot melt adhesives having excellent properties including resistance to embrittlement at low temperatures.

33 Claims, No Drawings

FATTY SEGMENTED POLYESTER ELASTOMERS

BACKGROUND OF THE INVENTION

Polyesters derived from polymeric fat acids, polymeric fat alcohols and dicarboxylic acids derived from fatty acids are well known in the prior art, but not those which are provided by the instant invention. Illustrative examples of some of these prior known polyesters derived from polymeric fat acids are contained in U.S. Pat. No. 3,057,824 relating to polyesters from dimer acids, U.S. Pat. No. 3,235,520 relating to resinous linear terpolyesters of a linear glycol and dimerized fatty acids, U.S. Pat. No. 3,287,273 relating to polyesters of alkane diols and dimers of fatty acids, and U.S. Pat. No. 3,530,082 disclosing linear polyester resins based on dimer fatty acids and certain dihydroxy compounds. Various polyesters derived from polymeric fat alcohols are found in U.S. Pat. No. 3,091,600 directed to linear aromatic acid copolyesters modified with dimer glycols having 36 carbons, and U.S. Pat. No. 3,511,792 directed to unsaturated polyester resins formed from polymeric fat alcohols and polycarboxylic acid.

U.S. Pat. No. 3,235,520 discloses that terpolyesters prepared from a mixture of terephthalic and isopthalic acids or esters, dimerized fatty acids and short chain alkylene glycols are useful as hot melt adhesives to form an adhesive bond between an insole rib and a fibrous insole. The patent discloses that the crystallinity of the terephthalate polyester is disrupted by the dimerized fatty acid component such that in an intermediate temperature range in the cooling of the molten terpolyester, the terpolyester has a mushy consistency with little or no holding power. The patent discloses that, by controlling the relative amounts of the dimerized fatty acid and phthalate components, i.e. less than 20 mole percent dimerized fatty acid, that the mushy effect is confined to a narrow temperature range. Accordingly, the patent teaches that the minimum desirable molar ratio of phthalates to fatty dimer acid is 4:1. The patent also discloses that the glycol component may contain, in addition to the short-chain alkylene glycol, up to 2 mole percent of a long-chain polyalkylene ether glycol to improve flexibility without incurring mush trouble. Accordingly, the patent teaches that the minimum desirable molar ratio of short-chain diol to long-chain ether diol disclosed by the patentee is 49:1.

SUMMARY OF THE INVENTION

This invention relates to a polyester polymer useful as an elastomer comprised of:
(a) aromatic units having the structure:

$$\left[ \begin{matrix} O & O \\ \| & \| \\ -C-R^1-C- \end{matrix} \right]_m$$

wherein $R_1$ is an aromatic hydrocarbon radical;
(b) fatty units having the structure:

$$\left[ \begin{matrix} O & O \\ \| & \| \\ -C-R^2-C- \end{matrix} \right]_n \quad (i)$$

or

-continued
$$\left[ -O-R^3-O- \right]_p \quad (ii)$$

wherein $R^2$ is a divalent hydrocarbon radical derived from polymeric fat acids or fatty diacids; and wherein $R^3$ is a divalent hydrocarbon radical derived from a polymeric fat alcohol or fatty diols;
(c) short-chain units having the structure:

$$\left[ -O-R^4-O- \right]_q$$

wherein $R^4$ is a divalent hydrocarbon radical derived from a short-chain diol reactant; and
(d) long-chain poly(ether) units having the structure:

$$\left[ -O-R^5-O- \right]_r$$

wherein $R^5$ is a divalent hydrocarbon radical derived from a long-chain poly(ether) diol reactant; wherein m, n, p, q and r are integers; provided that (i) the sum of m plus n plus p approximately equals the sum of q plus r; (ii) the ratio of m to (n plus p) is less than 4:1; and (iii) the ratio of q to r is less than 49:1.

The ratio of m to (n plus p) preferably ranges from about 3.5:1 to about 1:1 and most preferably from about 2.3:1 to about 1.5:1. The ratio of q to r preferably ranges from about 15:1 to about 2:1 and most preferably from about 11.5:1 to about 4:1.

These polyesters are the products of the polyesterification reaction of a mixture comprised of:
(a) W moles of an aromatic reactant selected from the group of aromatic dicarboxylic acids, alkylesters of aromatic dicarboxylic acids, and mixtures there- of.
(b) X moles of a fatty reactant selected from the group of (i) polymeric fat acids, (ii) polymeric fat alcohols, (iii) fatty diacids (iv) fatty diols and (v) mixtures thereof;
(c) Y moles of a short-chain diol reactant or mixtures thereof; and
(d) Z moles of a long-chain poly(ether) diol reactant or mixtures thereof;

provided that the ratio of W:X is less than 4:1 and the ratio of Y:Z is less than 49:1.

The ratio of W:X preferably ranges from about 3.5:1 to about 1:1, and most preferably about 2.3:1 to about 1.5:1. The ratio of Y:Z preferably ranges from about 35:1 to about 8:1, most preferably from about 24:1 to about 16:1.

The fatty, segmented polyester elastomers of the present invention demonstrate unique properties based on the presence of at least one reactant from all four classes of the above mentioned reactants, each of which reactants will be further described in detail hereinafter. The present fatty, segmented polyesters are less crystalline and more amorphous and elastomeric than most known polyesters derived from polymeric fat acids, polymeric fat alcohols or dicarboxylic acids derived from fatty acids. Their usefulness as hot melt adhesives for flexible substrates is particularly enhanced by their outstanding resistance to the embrittling effects of low temperature.

DETAILED DESCRIPTION OF THE INVENTION

The fatty, segmented polyester elastomers of the present invention are provided by the esterification polymerization of at least four reactants selected from four different groups of reactants, all of which must be present to give the unique properties of these polyester elastomers. These four different groups of reactants are:
  (a) Aromatic dicarboxylic acids, the alkyl esters of aromatic dicarboxylic acids, preferably phthalic acids, phthalic esters and mixtures thereof;
  (b) Polymeric fat acids, polymeric fat alcohols, fatty diacids and fatty diols, preferably dimeric fat acids, dimeric fat alcohols, fatty diacids or fatty diols ultimately derived from an unsaturated fatty acid or fatty alcohol containing 18 carbon atoms, and all of which preferably have molecular weights of about 200 to about 600, and mixtures thereof;
  (c) Short-chain diols, preferably alkylene diols or poly(oxyalkylene) diols of molecular weights of about 60 to about 400, and mixtures thereof; and
  (d) Long-chain poly(ether) diols, preferably poly(oxyalkylene) diols containing 2–4 carbon atoms in the alkylene portion thereof and preferably of molecular weight of about 600 to about 3000, and mixtures thereof. Aromatic dicarboxylic acids and esters of dicarboxylic acids of group (a) which are employed in the formation of the fatty, segmented polyester elastomers of the invention include: terephthalic acid, isophthalic acid, phthalic acid, diphenic acid, and naphthalic acid. The aromatic dicarboxylic acid can be employed in either free acid or esterified form. The alkyl esters containing from 1 to 8 carbon atoms in the alkyl group, particularly methyl, are preferred.

The term "polymeric fat alcohol" as used herein is intended to be generic to polymerized fatty alcohols. The alcohols may be obtained from "polymeric fat acids", according to the methods described in U.S. Pat. No. 3,511,792 i.e. by reducing the acid groups of a polymeric fat acid to hydroxyl groups. The term "polymeric fat acids" as used herein is intended to be generic to polymerized acids obtained from "fat acids", also according to methods described below. The term "fat acids" is intended to include saturated, ethylenically unsaturated and acetylenically unsaturated, naturally occurring and synthetic, monobasic aliphatic acids containing from 8–24 carbon atoms.

As used herein, the term "fatty diacid" shall be used to refer to the synthetic organic dicarboxylic acids derived from the reaction of an unsaturated fat acid and a second compound that will introduce a second carboxylic acid group or a functional group that can be derivatized to a second carboxylic acid group. One example of these synthetic organic diacids is the Diels-Alder reaction product of an unsaturated fat acid having conjugated ethylenic unsaturations with a short-chain unsaturated acid, e.g. the reaction of linoleic acid with acrylic acid to form a fatty diacid having 21 carbon atoms as is described in U.S. Pat. No. 3,753,968. Another example is the product obtained by (a) hydroformylating an unsaturated fat acid, and (b) oxidizing the resulting hydroformylated fat acid to a fatty diacid, e.g. the reaction of oleic acid with carbon monoxide and hydrogen to form 9(10)-formyloctadecanoic acid and the oxidation of the formyl octadecanol to 9(10)-carboxyoctadecanoic acid.

Similarly, the term "fatty diol" shall be used to refer to the synthetic organic diols derived by (a) reacting an unsaturated fat acid or alcohol with a second compound that will introduce a second aliphatic hydroxyl group into the fat acid or alcohol or a functional group that can be derivatized to an aliphatic hydroxyl group and (b) derivatizing the reaction product of step (a) to a compound having two aliphatic hydroxyl groups. One example of fatty diols is the product obtained by first hydroformylating an unsaturated fat alcohol and second reducing the hydroformylated fat alcohol or acid to produce a fatty diol. A comparable example is the product obtained by hydroformylating an unsaturated fat acid and reducing both the formyl group and the carboxylic acid group to prepare a fatty compound having two aliphatic hydroxyl groups. Another example is the product obtained by first effecting a Diels Alder reaction between a fat acid having conjugated ethylenic unsaturation and a short-chain unsaturated acid and second reducing both the acid groups of the resulting fatty diacid to produce a fatty diol.

The polymeric fat acids and polymeric fat alcohols of group (b) are well known and readily available commercially. One method of preparing polymeric fat acids is shown in U.S. Pat. No. 3,157,681. This patent also contains the general description of various other methods of preparing polymeric fat acids such as U.S. Pat. Nos. 2,347,562, 2,417,738, 2,426,489, 2,450,332, 2,673,184, 2,793,219, 2,793,220 and 2,955,121 which descriptions are hereby incorporated by reference. Briefly, the preferred method of preparing polymeric fat acids is by a process of polymerization consisting of heating unsaturated fatty acids (either an individual acid or mixtures thereof) derived from fats or oils at temperatures in the range of 180°–260° C. in the presence of a clay catalyst. The usual temperature employed is 200°–250° C. with about 230° C. being preferred. One method of preparing polymeric fat alcohols is shown in U.S. Pat. No. 3,511,792. This patent also contains a general description of various other methods such as U.S. Pat. No. 2,347,562. Also, U.S. Pat. No. 3,091,600 discloses another known method of preparing polymeric fat alcohols. All of these three descriptions are incorporated herein by reference. Briefly, the preferred method of preparing polymeric fat alcohols is by the hydrogenation of polymeric fat acids or their lower alkyl esters, or by the conversion of the carboxyl groups of these substances into hydroxyl groups by means of other reducing agents. For example, polymeric fat alcohols may be prepared by the catalytic hydrogenation, over copper chromite or zinc chromite, of polymeric fat acids or their alkyl esters at temperatures of at least about 200° C.

The saturated, ethylenically unsaturated and acetylenically unsaturated fat acids are generally polymerized by somewhat different techniques, but because of the functional similarities of the polymerization products, they all are generally referred to as "polymeric fat acids" and "polymeric fat alcohols".

Saturated fat acids are difficult to polymerize but polymerization can be obtained at elevated temperatures with a peroxidic catalyst such as di-t-butyl peroxide. Because of the generally low yields of polymeric products, these materials are not currently commercially significant. Suitable saturated fat acids include branched or straight chain acids such as caprylic acid, pelargonic acid, capric acid, lauric acid, myristic acid, palmitic acid, isopalmitic acid, stearic acid, arachidic acid, behenic acid, and lignoceric acid.

The ethylenically unsaturated acids are much more readily polymerized. Catalytic or non-catalytic polymerization techniques can be employed. The non-catalytic polymerization techniques generally require a higher temperature. Suitable catalysts for the polymerization include acid or alkaline clays, di-t-butyl peroxide, boron, trifluoride and other Lewis acids, anthraquinone, sulfur dioxide and the like. Suitable monomers include the branch and straight chain, poly- and mono-ethylenically unsaturated acids such as 3-octenoic acid, 11-dodecanoic acid, linderic acid, lauroleic acid, myristoleic acid, tsuzuic acid, palmitoleic acid, gadoleic acid, cetoleic acid, nervonic acid, moroctic acid, timnodonic acid, eicosatetraenoic acid, nisinic acid, scoliodonic acid, and chaulmoogric acid.

The acetylenically unsaturated fat acids can be polymerized by simply heating the acid. The polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight-chain and branch-chain, both mono-unsaturated and poly-unsaturated, are useful monomers for the preparation of polymeric fat acids. Suitable examples of such materials include 10-undecynoic acid, tariric acid, stearolic acid, behenolic acid and isamic acid.

As indicated, polymeric fat acids result from the polymerization of saturated, ethylenically unsaturated or acetylenically unsaturated naturally occurring or synthetic monocarboxylic aliphatic acids containing from 8-24 carbon atoms. The polymeric fat alcohols result from reducing the polymeric fat acids to the corresponding hydroxy compound. The preferred monocarboxylic acids from which polymeric fat acids are prepared are those containing about 16-20 carbon atoms and commercially the 18 carbon atom monocarboxylic acids such as oleic, linoleic, linolenic and eleostearic acids are employed as starting materials for the preparation of the polymeric fat acids and polymeric fat alcohols. A mixture of acids, tall oil fatty acids, (predominantly a mixture of oleic and linoleic acids) is the most common starting material.

After polymerization, with or without a catalyst, the resulting product is a mixture of predominantly dimeric fat acids, some trimeric and higher polymeric fat acids and some unpolymerized monomeric fat acids. Similarly, after the reduction of the polymeric fat acid, the resulting product is a mixture of predominantly dimeric fat alcohols, some trimeric and higher polymeric fat alcohols and some unpolymerized monomeric fat alcohols. Typical commercially available polymeric fat acids based on $C_{18}$ unsaturated acids, i.e. tall oil fatty acids, will have a dimeric fat acid content of about 60-80% by weight, a trimeric and higher polymeric fat acid content of about 10-35%, and a monomeric fat acid content of about 5-20% by weight. Similarly, typical commercially available polymeric fat alcohols based on $C_{18}$ unsaturated acids, i.e. tall oil fatty acids, will have a dimeric fat acid content of about 60-80% by weight, a trimeric and higher polymeric fat acid content of about 10-35%, and a monomeric fat acid content of about 5-20% by weight. The polymeric fat acids and polymeric fat alcohols may be fractionated to provide products having higher dimer contents, by conventional distillation, or solvent extraction techniques may be employed therefor. They may also be hydrogenated (before or after distillation) to reduce unsaturation, under hydrogen pressure in the presence of a hydrogenation catalyst, as illustrated in U.S. Pat. No. 3,256,304.

Reference has been made above to the monomeric, dimeric and trimeric fat acids present in the polymeric fat acids, and to the monomeric, dimeric and trimeric fat alcohols present in the polymeric fat alcohols. The amounts of monomeric fat acids or monomeric fat alcohols often referred to as monomer (M), dimeric fat acids and dimeric fat alcohols often referred to as dimer (D) and trimeric or higher polymeric forms, often referred to as trimer (T), may be determined by gas-liquid chromatography (GLC) of the methyl esters of the polymeric fat acids. In this method of analysis, an intermediate (I) is seen between the monomer and dimer forms. It is desirable that this intermediate be low, but polymeric fat acids generally having less than 10%, and preferrably less than 6% intermediate by weight, and polymeric fat alcohols of similar content, are satisfactory. Unless otherwise indicated, this analytical method was employed in the analysis of the polymeric fat acids and corresponding polymeric fat alcohols employed in this invention.

For the purpose of this invention, it is preferrable that the dimeric fat acid or dimeric fat alcohol content be 80% by weight or higher, with the higher amounts above 90% being preferred.

The preparation of fatty diacid from a fat acid having conjugated ethylenic unsaturations and a short-chain unsaturated acid is described in U.S. Pat. No. 3,753,968, the disclosure of which is incorporated herein by reference thereto. Briefly, a fatty acid having conjugated ethylenic unsaturations, such as linoleic acid, is reacted with a short-chain unsaturated acid, such as acrylic acid, at an elevated temperature, such as between about 200° C. and about 270° C. in the presence of a catalyst, such as iodine.

The preparation of fatty diacids derived from an unsaturated fat acid and carbon monoxide is described in U.S. Pat. Nos. 3,937,687 and 3,937,688, which are incorporated herein by reference. As described therein, the dicarboxylic acid is prepared by reacting an unsaturated fat acid with carbon monoxide and water as described in Reppe and Kroper, Ann. 582, 63-65 (1953), or to react the carbon monoxide and unsaturated fatty acid in the presence of hydrogen to provide the aldehyde or alcohol which are then oxidized to the acid. The preferred starting material is an unsaturated fatty acid such as oleic acid which is readily available commercially. With such acid, the resulting product is a $C_{19}$ dibasic acid, commonly referred to as heptadecane dicarboxylic acid, usually employed in the form of the mixture of isomers as a result of the method of preparation. The $C_{19}$ product might also be regarded as a stearic acid substituted with a carboxy group along the fatty chain predominantly at the 9 and 10 carbon atoms of the stearic acid.

The fatty diols, derived from unsaturated fatty alcohols and carbon monoxide, are well known in the art. The preferred fatty diols have molecular weights in the range of 200 to 400. U.S. Pat. No. 4,304,945 is illustrative of the hydroformylation and hydrogenation processes used to prepare a fatty diol. In this process, an unsaturated monomeric fatty acid is reacted with carbon monoxide and hydrogen in the presence of suitable catalysts. The carbon monoxide and hydrogen form an aldehyde moiety at one of the unsaturated carbon atoms in the fatty chain. The resulting formylated fatty alcohol is then reduced with hydrogen gas in the presence of a suitable catalyst to yield the fatty diol. The preferred fatty diol is 9(10)-hydroxymethyloctadecanol, which is derived from oleyl alcohol. The parenthetical numeral indicates that the formyl group can add to either the 9 or 10 carbon atom of oleyl alcohol to yield a formylated product and, ultimately, a fatty diol, that is a mixture of position isomers with respect to the hydroxymethyl group.

The short-chain diols of group (c) required in the preparation of the fatty, segmented polyester elastomers of the present invention are similarly well known and readily available commercially. Preferably, these are alkylene diols or short-chain poly(oxyalkylene) diols having molecular weights in the range of about 60 to about 400. Especially preferred short-chain diols are ethylene glycol, 1,4-butanediol, propylene glycol, neopentyl glycol, diethylene glycol, pentamethylene glycol and poly(ethylene glycol).

A short-chain diol such as ethylene glycol is relatively volatile in relation to the other reactants. Because a vacuum is generally used to remove by-product water and/or lower alcohols from the reaction mixture, a large excess of the short-chain diol is generally used to ensure that the short chain diol will be present in the resulting polyester in at least stoichiometric amounts, i.e. that the short-chain diol is incorporated in the polymer in an amount that is roughly equal to the sum of the equivalents of aromatic reactant and fatty acid reactants less the equivalents of the long-chain ether diol reactant. In other words, a large excess of a volatile short-chain diol is used to ensure that essentially all of the carboxyl groups are esterified. The excess volatile short-chain diol is then removed, e.g. by vacuum stripping. The excess of short-chain diol charged therefore accounts for the difference between q and Y and the corresponding difference between the ratios q:r and Y:Z.

The long-chain poly(ether) diols of group (d) are well known and readily available commercially. For the purpose of preparing the fatty, segmented polyester elastomers of this invention, preferred poly(ether) diols are poly(oxyalkylene) diols having chains of from 2-4 carbon atoms in the alkylene portion thereof and a total molecular weight in the range of about 600 to about 3,000. The preferred poly(oxyalkylene) diols are those having an alkylene group which is unbranched, i.e. in which the alkylene group is a chain of unsubstituted methylene units. An especially preferred poly(oxyalkylene) diol is a polytetramethylene ether glycol with a molecular weight of approximately 2,000 which is a reaction product of the polymerization of tetrahydrofuran.

Considerable variation is possible in the relative proportion of the reactants employed depending upon the particular set of properties desired in the fatty, segmented polyester elastomers, provided that the mole ratios of the aromatic reactant to fatty reactant and short-chain diol to poly(ether) diol are kept below 4:1 and 49:1 respectively.

Preferred fatty, segmented polyesters of this invention are products of the polymerization reaction of a mixture of:
(a) about 2 to about 5 moles of an aromatic dicarboxylic acid, or a dialkyl ester of an aromatic dicarboxylic acid;
(b) about 1.5 to about 3 moles of a polymeric fat acid or a fatty diacid;
(c) about 10 to about 30 moles of a short-chain alkylene diol; and
(d) about 0.75 to about 2.0 moles of a long-chain poly(oxyalkylene) diol.

Also preferred are polyesters which are the product of the reaction of a mixture of:
(a) about 8 to about 10 moles of an aromatic dicarboxylic acid, or a dialkylester of an aromatic dicarboxylic acid;
(b) about 3 to about 5 moles of a polymeric fat alcohol or a fatty diol;
(c) about 10 to about 30 moles of a short-chain alkylene diol, and
(d) about 0.75 to about 2.0 moles of a long-chain poly(oxyalkylene) diol.

It should be noted that the term "moles" is used to indicate a relative amount rather than an absolute measure, i.e. batch size limitations are not to be inferred from the use of the term "moles", above.

The time and temperature of the esterification or polymerization reaction, useful in preparing the fatty, segmented polyester elastomers of the present invention, may be varied over a considerable range so long as they are long enough and high enough to allow the reactants to polymerize to the desired degree. They are usually from about a 150° C. to about 300° C. for a period of about $\frac{1}{2}$ to about 8 hours, with the lower temperatures requiring the longer reaction periods. It is also desirable to employ techniques to remove from the reaction mixture volatile products of the polyesterification reaction, e.g. water and/or lower alcohols. Suitable techniques include subjecting the reaction mixture to a partial vacuum to remove the volatile byproducts and venting or condensing the removed by-products.

The mechanical properties of direct interest in the compositions of the present invention are tensile strength and the flexibility at low temperature. The tensile strength is measured on an Instron Tensile Tester Model TTC using ASTM D-638-80.

The polymer is compression molded as a 6"×6" sheet of approximately 0.05" thickness, at a temperature near its melting point (usually a few degrees lower than the melting point) using a parting agent in the mold. From this sheet, test specimens are die-cut to conform to ASTM D-638-80.

The test specimen is clamped in the jaws of the Instron. Crosshead speed is usually 0.5" per minute at 100 lb. full scale load. Chart speed is 0.5" per minute. Tensile strength (reference: ASTM D-638-80) is calculated as:

$$\text{Tensile Strength} = \frac{\text{load in pounds}}{\text{Cross sectional area (sq. in.)}}$$

Percent elongation is calculated as:

Percent elongation =

$$\frac{(\text{gauge length at break}) - (\text{gauge length at 0 load})}{\text{gauge length at 0 load}} \times 100$$

In addition to tensile strength at break and elongation, the tensile strength at 100% elongation was measured on most of the polymers prepared according to ASTM D-638-80. The apparent modulus of rigidity was measured according to ANSI/ASTM D-1043-72.

EXAMPLE 1

A fatty, segmented polyester elastomer was prepared from four reactants, each of which was selected from the four required reactant groups in the following amounts:

| Reactant | MW | Moles Charged | Grams | Moles Theoretically Reacted |
|---|---|---|---|---|
| Dimethyl Terephthalate | 194 | 0.18 | 34.9 | 0.18 |
| VERSADYME ® 52 | 576 | 0.12 | 69.1 | 0.12 |
| 1,4-Butanediol | 90 | 0.96 | 86.4 | 0.24 |
| T-2000 | 2000 | 0.06 | 120.0 | 0.06 |
| Dibutyltin oxide | — | — | 0.34 | |

The ratio of m:n (p was zero) was 1.5:1 and the ratio of q:r was 4.0:1.

VERSADYME® 52 is a registered trademark of Henkel Corporation for its dimerized fatty acid. The composition of this acid, which is a polymerized tall oil acid, determined by gas liquid chromotography (GLC) of the methyl esters of the polymeric fat acid, as earlier noted, is reported as the following typical composition according to the manufacturer's specification:

| TYPICAL COMPOSITION OF VERSADYME 52: | | | |
|---|---|---|---|
| % Monomer | (M) | by wt. | 2% maximum |
| % Dimer | (D) | by wt. | 88% minimum |
| % Trimer | (T) | by wt. | 5% maximum |
| % Intermediate | (I) | by wt. | 6% maximum |

T-2000 is a commercially available (Teracol 2000 from DuPont) polytetramethylene ether glycol having a molecular weight of 2000.

The reactants were heated to 170° C. in about 35 minutes to 220° C. in the next 25 minutes and to 250° C. in the next 45 minutes. The reactants were then maintained at 250° C. for one hour and cooled until the next day. A final heating brought the temperature to 250° C. where it was maintained for about 3 hours. During this time, the methanol evolved from transesterification and the excess 1,4-butanediol were removed through a short Vigreaux column and collected.

The resulting polyester had the following characteris- tics:
Inherent Viscosity=1.20 (at 0.5% by wt. in o-chlorophenol)
Acid Value=2.0
Hydroxyl Value=0.8
Ball and Ring Melting Point=140° C.
Tensile Strength at Break=sample did not break
Percent Elongation=greater than 1200
Tensile Strength at 100% Elongation=104 psi
Temp. at which apparent modulus of rigidity reaches 3333 psi=−65° C.

EXAMPLE 2

A segmented fatty polyester elastomer was prepared from four reactants selected from the four required reaction groups in the following amounts:

| Reactant | MW | Moles Charged | Grams | Moles Theoretically Reacted |
|---|---|---|---|---|
| Dimethyl Terephthalate | 194 | 0.35 | 67.9 | 0.35 |
| HDA | 332 | 0.15 | 49.8 | 0.15 |
| 1,4-Butanediol | 90 | 1.68 | 151.2 | 0.42 |
| T-2000 | 2000 | 0.08 | 160.0 | 0.08 |
| Dibutyltin oxide | — | — | 0.42 | |

The ratio of m:n (p was zero) was 2.33:1 and the ratio of q:r was 5.25:1.

HDA is a commercially available (BASF) heptadecane dicarboxylic acid in the form of a mixture of isomers.

The reactants were stirred efficiently while being heated to 250° C. over a period of 1½ hours and maintained at that temperature for a further 95 minutes. A vacuum of 1.2 mm Hg was applied and maintained for 2 hours during which time the residual methanol and 1.26 moles of excess 1,4 butane diol were distilled off. The vacuum was broken, the polymer was discharged and cooled.

The resulting fatty, segmented polyester elastomer had the following characteristics:
Ball and Ring Melting Point=150° C.
Inherent Viscosity=1.10
Tensile Strength at break=555 psi
Percent Elongation=600
Tensile Strength at 100% Elongation=275 psi
Temp. at which apparent modulus of rigidity reached 3333 psi=−61° C.

EXAMPLE 3

A fatty, segmented polyester elastomer was prepared from four reactants selected from the four groups in the following amounts:

| Reactant | MW | Moles Charged | Grams | Moles Theoretically Reacted |
|---|---|---|---|---|
| Dimethyl Terephthalate | 194 | 0.60 | 116.4 | 0.60 |
| Fatty Diol | 304 | 0.20 | 60.8 | 0.20 |
| Ethylene Glycol | 62 | 1.40 | 86.8 | 0.75 |
| T-2000 | 2000 | 0.05 | 100.0 | 0.05 |

The ratio of m:p (n was zero) was 3:1 and the ratio of q:r was 15:1.

The fatty diol is a 9(10)-hydroxymethyloctadecanol derived from the hydroformylation of oleyl alcohol and reduction of the hydroformylated product.

The reactants were stirred efficiently and were gradually heated to 250° over a period of five hours. A vacuum of 2.6 mm Hg was then applied and maintained for two hours during which time excess ethylene glycol and residual methanol were distilled off. The vacuum was then broken and the polyester was discharged and cooled.

The resulting fatty, segmented polyester elastomer had the following characteristics:
Inherent Viscosity=0.74
Ball and Ring Melting Point=160° C.
Tensile Strength at break=667 psi
Percent Elongation=600
Tensile Strength at 100% Elongation=458 psi
Temp. at which apparent modulus of rigidity reaches 3333 psi=−43° C.

EXAMPLE 4

A fatty, segmented polyester elastomer was prepared from four reactants selected from the four required reaction groups:

| Reactant | MW | Moles Charged | Grams | Moles Theoretically Reacted |
|---|---|---|---|---|
| Dimethyl Terephthalate | 194 | 0.50 | 97.0 | 0.50 |
| Dimerol | 538 | 0.15 | 80.7 | 0.15 |
| Ethylene glycol | 62 | 1..20 | 74.4 | 0.60 |
| T-2000 | 2000 | 0.05 | 100.0 | 0.05 |

The ratio of m:p (n was zero) was 3.33:1 and the ratio of q:r was 12:1.

Dimerol is a dimer glycol prepared by reducing a polymeric fat acid or ester thereof. The preparation and structure of the dimerized fatty acid and the dimer glycol prepared from it is described in J. Amer. Chem. Soc. 66, 84(1944) and in U.S. Pat. Nos. 2,347,562, and 3,091,600.

The reaction was carried out in much the same manner as that described for the preparation of the fatty, segmented polyester elastomer described in Example 2 above. The reaction product had a Ball and Ring Melting Point=165° C. and an Inherent Viscosity=1.12.

The polyester was used as a heat activated adhesive between layers of 0.007 inch steel, between layers of aluminum, and between layers of Standard Cement Liner, a standard rubber substrate used for adhesion testing to simulate shoe soling material. Also, bonds were prepared between cotton backed, plasticized vinyl, such as used for shoe uppers, and Standard Cement Liner (SCL). The bonds thus made can be pulled in 180° peel configuration at 10" per minute. The values for this adhesive were as follows:

On 0.007" Steel=18 pounds per inch width
On SCL=24 pounds per inch width
On SCL/vinyl=34 pounds per inch width
On Aluminum=7 pounds per inch width A sample of the polyester was also extruded through an extruder at 200° C. The extrudate formed a well-defined rod upon passage through the die of the extruder.

EXAMPLE 5

A fatty segmented polyester elastomer was prepared from the following four reactants selected from the four required reactant groups:

| Reactant | MW | Moles Charged | Grams | Moles Theoretically Reacted |
|---|---|---|---|---|
| Dimethyl Terephthalate | 194 | 0.245 | 47.5 | 0.245 |
| Versadyme 52 | 576 | 0.105 | 60.5 | 0.105 |
| 1,4-Butanediol | 90 | 1.176 | 105.8 | 0.294 |
| T-2000 | 2000 | 0.056 | 112.0 | 0.056 |
| Dibutyltin oxide | — | — | 0.33 | |

The ratio of m:n (p was zero) was 2.33:1 and the ratio of q:r was 11.5:1.

The reaction was carried out in much the same manner as that described for the preparation of the fatty, segmented polyester elastomer in Example 2 immediately above including the removal of the short chain diol by vacuum distillation. The characteristics of the product were determined as follows:

Inherent Viscosity=1.20
Ball and Ring Melting Point=153° C.
Tensile Strength at Break=762 psi
Percent Elongation=845
Tensile Strength at 100% Elongation=275 psi
Temp. at which apparent modulus of rigidity reached 3333 psi=−66° C.

The fatty, segmented polyester elastomer above was extruded through an extruder at 200° C., and thereafter heat activated as a hot melt adhesive to bond the same substrates as recited in Example 5. The bond values determined in 180° peel pulled at 10" per minute were:

On 0.007" Steel=11 pounds per inch width
On SCL=19 pounds per inch width
On SCL/vinyl=6 pounds per inch width
On Aluminum=15 pounds per inch width Examples 4 and 5 above demonstrate that the thermoplastic fatty, segmented polyester elastomers of the present invention may be extruded without degradation. Example 5 demonstrates that the extrudates of the polymers of this invention may be used as hot melt adhesives in the bonding of flexible substrates.

The extrudate formed a well-defined rod upon passage through the die which demonstrates that representative fatty, segmented polyester elastomers of this invention are not "mushy" and are eminently suited for use as hot melt adhesives. The adhesive tests show that representative polyesters of this invention are particularly useful in bonding flexible substrates such as natural or synthetic rubber. Moreover, the very low temperatures at which the apparent moduli of rigidity of the polyesters reaches 3333 psi indicates the excellent resistance to embrittlement possessed by these representative polyesters when used as adhesives which are subjected to low temperatures

What is claimed is:

1. A polyester polymer useful as an elastomer comprised of:

(a) aromatic units having the structure:

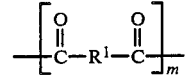

wherein $R_1$ is an aromatic hydrocarbon radical;

(b) fatty units having the structure:

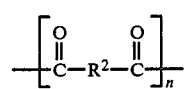  (i)

or

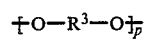  (ii)

wherein $R^2$ is a divalent hydrocarbon radical derived from polymeric fat acid or a fatty diacid; and wherein $R^3$ is a divalent hydrocarbon radical derived from a polymeric fat alcohol or a fatty diol;

(c) short-chain units having the structure:

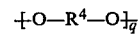

wherein R⁴ is a divalent hydrocarbon radical derived from a short-chain diol reactant; and
(d) long-chain poly(ether) units having the structure:

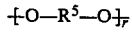

wherein R⁵ is a divalent hydrocarbon radical derived from a long-chain poly(ether) diol reactant; wherein m,n,p,q and r are integers; provided that (i) the sum of m plus n plus p approximately equals the sum of q plus r; (ii) the ratio of m to (n plus p) is less than 4:1 and (iii) the ratio of q:r is less than 49:1.

2. A polyester as defined in claim 1 wherein the ratio of m to n plus p ranges from about 3.5:1 to about 1:1 and the ratio of z to r ranges from about 15:1 to about 2:1.

3. A polyester as defined in claim 1 wherein the ratio of m to n plus p ranges from about 2.3:1 to about 1.5:1 and the ratio of q to r ranges from about 11.5:1 to about 4:1.

4. A polyester as defined in claim 1 wherein R¹ is a phenylene or naphthalene radical.

5. A polyester as defined in claim 4 wherein R¹ is a 1,4-phenylene radical.

6. A polyester as defined in claim 1 wherein R² is derived from a polymeric fat acid.

7. A polyester as defined in claim 1 wherein R² is derived from a fatty diacid.

8. A polyester as defined in claim 1 wherein R³ is derived from a polymeric fat alcohol.

9. A polyester as defined in claim 1 wherein R³ is derived from a fatty diol.

10. A polyester as defined in claim 1 wherein R⁴ is selected from the group of alkylene radicals, alkenylene radicals and poly(oxyalkylene) radicals each having molecular weights of about 400 g/mole or less.

11. A polyester as defined in claim 1 wherein R⁵ is a polyoxyalkylene radical having a molecular weight from about 600 g/mole to about 3000 g/mole.

12. A process for preparing a fatty, segmented polyester elastomer comprising esterifying a mixture comprised of:
(a) W moles of an aromatic reactant selected from the group of aromatic dicarboxylic acids, alkylesters of aromatic dicarboxylic acids and mixtures thereof;
(b) X moles of a fatty reactant selected from the group of fatty reactants consisting of (i) polymeric fat acids, (ii) polymeric fat alcohols, (iii) fatty diacids, (iv) fatty diols and (v) mixtures thereof;
(c) Y moles of a short-chain diol reactant or mixtures thereof; and
(d) Z moles of a long-chain poly(ether) diol reactant or mixtures thereof; provided that the ratio of W:X is less than about 4:1 and the ratio of Y:Z is less than about 49:1.

13. A process as defined in claim 12 wherein the ratio of W:X ranges from about 3.5:1 to about 1:1 and the radio of Y:Z ranges from about 35:1 to about 8:1.

14. A process as defined in claim 12 wherein a reactant chosen from group (b) is a dimeric fat acid of molecular weight of 300 to 600.

15. A process as defined in claim 12 wherein a reactant chosen from the group (b) is a polymerized C₁₈ monocarboxylic fatty acid.

16. A process as defined in claim 12 wherein a reactant chosen from group (b) is fatty diacid which is derived from the reaction of a fat acid having conjugated ethylenic unsaturations and a short-chain unsaturated acid.

17. A process as defined in claim 12 wherein a reactant chosen from group (b) is a fatty diacid which is derived from an unsaturated fat acid and carbon monoxide.

18. A process as defined in claim 12 wherein a reactant chosen from group (b) is a dimeric fat alcohol of molecular weight of 300 to 600.

19. A process as defined in claim 12 wherein a reactant chosen from group (b) is a polymeric fat alcohol which is a dimer glycol containing 36 carbon atoms and is the reduced dimer of an unsaturated fat acid selected from the group consisting of oleic, linoleic and linolenic acids.

20. A process as defined in claim 12 wherein a reactant chosen from group (b) is a fatty diol derived from an unsaturated fatty alcohol and carbon monoxide.

21. A process as defined in claim 20 wherein a reactant chosen from group (b) is a 9(10)-hydroxymethyloctadecanol.

22. A process as defined in claim 12 wherein a reactant chosen from group (b) is a fatty diol derived by reducing both acid groups of a fatty diacid in turn derived from a fat acid having conjugated ethylenic unsaturations and a short-chain unsaturated acid.

23. A process as defined in claim 12 wherein a reactant chosen from group (d) is a poly(oxyalkylene) diol which contains 2-4 carbon atoms in the alkylene portion thereof and has a molecular weight of about 600 to about 3000.

24. A process as defined in claim 12 wherein a reactant chosen from group (d) is a polytetramethylene ether glycol.

25. A process as defined in claim 12 wherein a reactant chosen from group (c) is an alkylene diol of molecular weight of about 60 to about 400.

26. A process as defined in claim 25 wherein a reactant chosen from group (c) is selected from the group consisting of 1,4-butanediol, ethylene glycol, propylene glycol, neopentyl glycol, diethylene glycol, pentamethylene glycol, and polyethylene glycol.

27. A process as defined in claim 26 wherein a reactant chosen from the group (c) is selected from the group consisting of 1,4-butanediol and ethylene glycol.

28. A process as defined in claim 12 wherein a reactant chosen from group (a) is selected from the group consisting of phthalic acid, isophthalic acid, terephthalic acid, diphenic acid, naphthalic acid and the lower alkyl esters thereof in which said alkyl group contains 1-8 carbon atoms.

29. A process as defined in claim 12 wherein a reactant chosen from group (a) is dimethyl terephthalate.

30. A process as defined in claim 12 wherein the mixture is comprised of:
(a) about 2 to about 5 moles of an aromatic dicarboxylic acid, or a dialkyl ester of an aromatic dicarboxylic acid;
(b) about 1.5 to about 3 moles of a polymeric fat acid, or a fatty diacid;
(c) about 10 to about 30 moles of a short-chain alkylene diol; and
(d) about 0.75 to about 2.0 moles of a long-chain poly(oxyalkylene) diol.

31. A process as defined in claim 12 wherein the mixture is comprised of:

(a) about 8 to about 10 moles of an aromatic dicarboxylic acid, or a dialkylester of an aromatic dicarboxylic acid;
(b) about 3 to about 5 moles of a polymeric fat alcohol or a fatty diol;
(c) about 10 to about 30 moles of a short-chain alkylene diol, and
(d) about 0.75 to about 2.0 moles of a long-chain poly(oxyalkylene) ether diol.

32. A method of bonding natural rubber or synthetic rubbers to a substrate comprising applying thereto a polyester polymer as defined in claim 1 by means effective to activate the adhesive properties of the fatty segmented polyester composition.

33. A bonded article comprised of natural rubber or synthetic rubber bonded to a substrate by a polyester polymer as defined in claim 1.

* * * * *